Patented Dec. 25, 1934

1,985,453

UNITED STATES PATENT OFFICE 1,985,453

DEHYDRATION OF SYNTHETIC RESINS

Arthur W. Luedeke, Elizabeth, N. J., assignor to Combustion Utilities Corporation, New York, N. Y., a corporation of Maine No Drawing. Application January 9, 1931, Serial No. 507,763

2 Claims. (Cl. 260—4)

The present invention relates to the dehydration of synthetic resins, and more especially it concerns the processing of synthetic resins of the potentially-reactive type susceptible of being converted to the infusible-insoluble type by heat, such as those prepared by the reaction of phenols with formaldehyde in the presence of a suitable catalyst.

In the preparation of potentially-reactive synthetic resins of the well-known phenol-formaldehyde type, the dehydration of the resin after precipitation becomes a delicate procedure,—especially where the resin is sensitive to heat which exerts a curing effect thereon. The present commercial method of dehydrating resins of this type is by distillation, preferably under vacuum, which necessitates the taking of many precautions in order to prevent the curing or setting up of the resin during the dehydration. Such curing produces resins which are unsuitable for many of the ordinary uses for which these resins are employed in the arts, in view of the inability of the cured resin to dissolve in the usual resin solvents, such as alcohol, alcohol-benzol mixtures and the like employed in the preparation of varnishes intended for the wet impregnation of paper and other fibrous materials used in the manufacture of laminated products. Synthetic resins of the above-mentioned types frequently are "set up" or converted during vacuum distillation at temperatures no higher than 160° F. The use of low temperatures in connection with vacuum distillation of the resin involves the processing of a liquid resin mixture of high viscosity, which greatly hinders the removal of traces of oil from the resin and also gives rise to foaming. The viscous resin remaining in the kettle after the distillation is frequently difficult to remove.

It has now been determined that the dehydration of precipitated potentially-reactive resins such as those of the phenol-formaldehyde type, either in the crude state or after the refining thereof, can be conveniently accomplished without injury thereto by distilling a solution of the said resin in a suitable volatile resin solvent, until the water content has been removed together with a portion of the solvent, leaving behind as a residue a solution of the resin in the volatile solvent, free of water and adapted directly for use in impregnating paper and the like in the manufacture of laminated products, resin coating compositions, and the like.

Among the more important objects of the present invention are to provide a novel method for preventing or retarding polymerization of potentially-reactive resins during their dehydration; to provide in an improved manner for the dehydration of crude synthetic resins of the type convertible by heat to the cured state; to provide in an improved manner for maintaining a suitable low viscosity in a synthetic potentially-reactive resin during the dehydration thereof with the aid of heat; and to provide for the preparation of a varnish solution suitable for impregnating purposes direct from a crude synthetic resin of the potentially-reactive type containing moisture.

The present invention in its broadest scope comprises the steps of dissolving a potentially-reactive synthetic resin in a suitable volatile solvent or mixture of solvents therefor, following which the resultant solution of resin is fractionally distilled, under vacuum or at atmospheric pressure and under conditions whereby substantial portions of the solvent are distilled off carrying therewith the water content of the crude resin.

While very satisfactory resin dehydration is effected by the use of a low boiling solvent such as denatured ethyl alcohol or acetone and mixtures of these solvents such as a benzol-ethyl alcohol mixture, yet it is possible to employ as a solvent high boiling solvents such as cresylic acid, pine oil, and fusel oil. In the latter case the solvents are generally immiscible with water, and the distillation is carried out with refluxing equipment whereby the water alone is removed, the pine oil or other water-immiscible solvent being returned to the resin solution in the kettle.

After the dehydration of the resin has been effected by distillation of a solution thereof in a relatively large proportion of the solvent or solvent mixture, the amount of solvent in the solution may be very appreciably reduced without danger of curing the resin, since the dehydrated resin requires much less solvent for its solution than does the wet resin.

In the preparation of a potentially-reactive resin from tar oils by the treatment thereof with formaldehyde in the presence of a small amount of alkali as catalyst, the resultant resin precipitates from the mixture to form a layer containing in addition to the resin,—water and some residual tar oil. Both of these latter impurities must be removed. Practically all of the oil may be separated from the resin by adding to the reaction mixture suitable petroleum hydrocarbons or other solvents in which the residual oil is soluble but in which the resin is substantially insoluble. The resultant resin thus precipitated is then treated according to the present invention for the removal of the water still present therein. The following example will illustrate one modification of the invention in which denatured alcohol alone is employed as the dehydrating agent.

Ten gallons of a low temperature tar distillate having a boiling range up to 300° C. had admixed therewith 22 pounds of U. S. P. formalin and 2 litres of a normal caustic soda solution. This mixture was then heated for three quarters of an hour at 202° to 205° F. Thereafter 10 gallons of "Varsol", a petroleum distillate, was added to the reaction mixture to wash the resin free of neutral oil and to assist in the complete separation of the resin from the residual oil. This action was aided by the further addition of 10 gallons of water. The wet resin thus precipitated was dissolved with agitation in 10 gallons of 95% denatured alcohol, and the resultant solution was subjected to distillation at atmospheric pressure (vapor temperature about 80° C.).

During the distillation, additional alcohol was added to the reaction mixture to replace that distilled away and the distillation was continued until about 17 gallons of alcohol had been distilled off. The remaining alcohol-resin mixture was then recovered in the form of a concentrated varnish composition or base, adjusted to a specific gravity of 1.02 by addition of further alcohol, the product having approximately a 50% resin content. The wet alcohol obtained in the resin dehydration step may be rectified by means of the usual fractionation equipment.

Care must be taken to prevent the removal of too large a proportion of the alcohol during the distillation step in order to avoid any tendency of the resin to precipitate from solution during this step. In the above example, 7 gallons of the alcohol initially added to the resin may be distilled off before the addition of further alcohol is made, without any injury to the desired product. The specific gravity of the remaining resin solution may be properly adjusted by removal of additional solvent by further distillation. In instances where the precipitated resin is exceptionally wet, the time required for the distillation is lengthened in order to effect the dehydration, additional solvent being added periodically or continuously, as needed.

Obviously where other resin solvents are employed in place of denatured alcohol, the distillation temperatures employed for the dehydration will be different from that given above. For instance a wet potentially-reactive resin of the type described above was dehydrated by dissolving the same in pine oil in the proportions of 1 kg. of the wet resin to 3 liters of pine oil. This solution was distilled with agitation to a temperature of 180° C., the water being completely removed, and the pine oil solution of the dry resin was then recovered. Lower distillation temperatures may be employed by the use of vacuum distillation. The resin was not cured or otherwise injuriously affected by the distillation at these high temperatures.

It is frequently found desirable to employ a mixture of volatile solvents for the resin in the dehydration process, and especially such mixtures of solvents as yield with water,—constant boiling mixtures having relatively low boiling points. To illustrate this modification of the invention the following example is cited:

A potentially-reactive resin was produced by the treatment of 300 c. c. of a tar distillate having a boiling range up to 300° C. with 79.1 g. formalin and 16.25 c. c. N. sodium hydroxide. The resultant resin was then washed with 300 c. c. of a petroleum distillate to dissolve the neutral oil, and the resin was then separated from the oil by the addition of water. The separated resin was then drained and dissolved in 250 c. c. of a 1:3 mixture of benzol-denatured alcohol, and this was then distilled at atmospheric pressure and at a vapor temperature of about 86° C.,—additional solvent being added during the distillation at the same rate as solvent was being removed by distillation. A dry resin solution was obtained after 900 c. c. of the mixed solvent had been distilled and recovered.

There is an advantage to be obtained by employing a solvent mixture of somewhat higher boiling point than the benzol-alcohol mixture mentioned. A 50–50 mixture of benzol and denatured alcohol may be employed in the process, which mixture, at atmospheric pressure, distills at a temperature of about 91° C. In this instance it is preferable to use in the neighborhood of three times the amount of solvent as of the wet resin being dehydrated.

Similarly a 1:1 mixture of isobutanol and benzol may be employed for dissolving the wet resin, with successive additions to the solution of a 1:3 isobutanol-benzol mixture during the distillation at about 86° C. 2½ parts of the solvent to 1 part resin is quite satisfactory. In like manner 1:2 mixtures of iso-amyl alcohol and benzol, 1:2 mixtures of tertiary butanol and benzol, and 1:1 mixtures of fusel oil and benzol have been satisfactorily employed in the practice of the present invention, in each case yielding a dehydrated resin whose curing properties had not been injuriously affected by the heat treatment. The distillation temperatures when using the fusel-oil-benzol mixture have been as high as 130° C.

Tertiary butanol alone may be used as a solvent for the wet resin. The addition of 600 c. c. of tertiary butanol to 100 grams of wet resin, followed by the distillation thereof at about 82° C. until 80% of the solvent had been removed, yielded a dry resin solution in tertiary butanol. The water may be subsequently removed from the distilled tertiary butanol in any suitable manner, such as by the salting out method described by Ginning and Robbins (J. A. C. S. vol. 52, page 2282).

Other volatile solvents found to be suitable for use in connection with the present invention include the secondary alcohols, such as those obtainable from the unsaturated hydrocarbons of petroleum cracking-still gases. The solvents and solvent mixtures found in the alcoholic fractions of the drip obtained by the partial oxidation of natural gas and other hydrocarbons are also adapted for use in the process.

Laminating varnishes may thus be made directly by the treatment of a wet crude potentially-reactive resin with a suitable solvent or mixture of solvents, followed by a controlled distillation. Where a mixture of solvents which includes benzol is employed, it is preferable to select as the other solvent one having a boiling point somewhat higher than the benzol, so that the latter will function largely for dehydration with a minimum or relatively small removal of the other solvent. N-butanol-benzol mixtures have been employed successfully.

It is generally desirable that the specific gravity of the dehydrated resin solution be about 1.02, as this is the preferred specific gravity for commercial impregnating varnishes. In the practice of the present invention the desired specific gravity of the solution may be obtained by controlling the quantity of solvent remaining with the resin after the dehydration step, or by carrying the distillation to a point where the specific gravity of the resin solution is above that desired, thereafter cooling the solution and thinning it with denatured alcohol or other varnish diluent to the desired point. The invention is susceptible of modification within the scope of the appended claims.

I claim:

1. In the preparation of a dehydrated potentially-reactive resin of the phenol aldehyde type direct from a tar distillate, the steps which comprise reacting the tar distillate with formaldehyde and a catalyst while heating the same, thereby producing a reaction mixture containing a potentially-reactive synthetic resin, hydrocarbons, and an aqueous liquid, diluting the said reaction mixture with a solvent for the hydrocarbon oil components of the reaction mixture but which is a non-solvent for the resin, further diluting the reaction mixture with a liquid which is a solvent for the said aqueous liquid but is a non-solvent both for the hydrocarbons and the resins of the said reaction mixture, separating the wet resin from the remainder of the reaction mixture, dissolving the former in an excess of a volatile resin solvent, distilling the resultant solution, and removing overhead the water content of the resin while maintaining the resin throughout the said distillation in an excess of the last-named solvent.

2. In the preparation of a dehydrated potentially-reactive resin of the phenol aldehyde type direct from a tar distillate, the steps which comprise reacting the tar distillate with an aldehyde and a catalyst at a temperature around the boiling point of the mixture, thereby producing a reaction mixture containing a potentially-reactive synthetic resin, hydrocarbons and an aqueous liquid, separating the synthetic resin from the reaction mixture and washing the former with a solvent for the neutral oil components but which is a non-solvent for the resin, adding water to the resultant mixture thereby segregating the resin from the oil, recovering the resin and dissolving it in an excess of a volatile resin solvent, and distilling the resultant solution while replacing the solvent at substantially the same rate at which it is distilled away, thereby removing the water content of the resin while maintaining the latter in potentially-reactive form.

ARTHUR W. LUEDEKE.